United States Patent [19]

Bolton et al.

[11] Patent Number: 5,550,381
[45] Date of Patent: Aug. 27, 1996

[54] EVENT COUNTING ALPHA DETECTOR

[75] Inventors: Richard D. Bolton; Duncan W. MacArthur, both of Los Alamos, N.M.

[73] Assignee: The Regents of the University California, Oakland, Calif.

[21] Appl. No.: 333,020

[22] Filed: Nov. 1, 1994

[51] Int. Cl.⁶ .................... G01T 1/18; G01T 1/185
[52] U.S. Cl. .................. 250/380; 250/374; 250/379; 250/382; 250/435
[58] Field of Search ................... 250/380, 382, 250/374, DIG. 2, 379, 435

[56] References Cited

U.S. PATENT DOCUMENTS

| | | | |
|---|---|---|---|
| 2,892,091 | 6/1959 | Sawle | 250/435 |
| 2,972,678 | 2/1961 | Anton | 250/435 |
| 4,262,203 | 4/1981 | Overhoff | 250/380 |
| 4,894,535 | 1/1990 | Madnick et al. | 250/435 |
| 4,972,081 | 11/1990 | Dunbeck Sr. | 250/DIG 2 |
| 5,003,176 | 3/1991 | Tanaka et al. | 250/374 |
| 5,026,986 | 6/1991 | Hurst | 250/379 |
| 5,029,248 | 7/1991 | Miyake | 250/DIG. 2 |
| 5,281,824 | 1/1994 | MacArthur et al. | 250/380 |

*Primary Examiner*—Constantine Hannaher
*Assistant Examiner*—Virgil O. Tyler
*Attorney, Agent, or Firm*—Milton D. Wyrick; William A. Eklund

[57] ABSTRACT

An electrostatic detector for atmospheric radon or other weak sources of alpha radiation. In one embodiment, nested enclosures are insulated from one another, open at the top, and have a high voltage pin inside and insulated from the inside enclosure. An electric field is produced between the pin and the inside enclosure. Air ions produced by collision with alpha particles inside the decay volume defined by the inside enclosure are attracted to the pin and the inner enclosure. With low alpha concentrations, individual alpha events can be measured to indicate the presence of radon or other alpha radiation. In another embodiment, an electrical field is produced between parallel plates which are insulated from a single decay cavity enclosure.

2 Claims, 6 Drawing Sheets

EVENT COUNTING ALPHA DETECTOR

This invention was made with Government support under Contract No. W-7405-ENG-36 awarded by the U.S. Department of Energy. The Government has certain rights in the invention.

BACKGROUND Of THE INVENTION

The present invention generally relates to the detection of alpha radiation and, more specifically, to the detection of radon or other sources of alpha radiation through the counting of alpha events occurring inside a decay cavity.

It has been found that, on average, radon constitutes more than half of the normal background radioactivity in the environment. Gaseous $^{222}$radon, produced by natural radium in the ground, is the isotope primarily responsible for such radioactivity. When $^{222}$radon enters a house, either through small fissures, or in well water, it can remain in the air if not ventilated. In such a case, the $^{222}$radon decays to non-gaseous radioactive daughter products that can be absorbed in the lungs and can lead, over a long period of exposure, to lung cancer. The U.S. Environmental Protection Agency has estimated that between 7,000 and 30,000 of the 130,000 lung cancer deaths annually may be attributed to indoor radon. The Environmental Protection Agency recommends remedial action if radon levels in homes exceed 4 trillionths of a curie, or 4 picocuries of radon per liter (pCi/L) of air. Although initial discoveries pointed to particular areas susceptible to radon pollution, it is now known that high concentrations exist in many parts of the United States, as well as in a number of European countries.

The recent public awareness concerning the existence of radon gas has brought about a demand for sensitive and accurate detection instruments. At the present, there are numerous commercial offerings of devices intended to detect radon, the devices having varying degrees of effectiveness. All of these devices suffer from one or more of the following problems: (1) lack of sensitivity, (2) slow response time, and (3) high cost.

The present invention provides a radon detection instrument which solves these problems. It is based on technology which is contained in several U.S. Patents which disclose various devices for the long range detection of alpha particles. The first is U.S. Pat. No. 5,184,019, issued Feb. 2, 1993, for a Long Range Alpha Particle Detector. The second is U.S. Pat. No. 5,194,737, issued Mar. 16, 1993, for Single and Double Grid Long Range Alpha Detectors. The third is U.S. Pat. No. 5,187,370, issued Feb. 16, 1993, for Alternating Current Long Range Alpha Particle Detectors. The fourth is U.S. Patent No. 5,281,824, issued Jan. 25, 1994, for Radon Detection. The fifth is U.S. Pat. No. 5,311,025, issued May 10, 1994, for Fan-less Long Range Alpha Detector. The principle underlying each of these patents is that alpha particles, although themselves of very short range in air, ionize various of the molecular species in air. These ions, referred to herein as "air ions," have a sufficiently long lifetime that they may be transported by mass flow of the surrounding air, and detected at distances much greater than the penetration distances of the original alpha particles by the apparatus disclosed in the above-referenced patents. The present invention modifies this apparatus to provide for reliable detection of radon through the electrostatic detection of individual pulses created by low level radon decay.

Although the previous long range alpha detectors are extremely efficient in detecting ions created by radiation, they are not as sensitive as possible because they are primarily direct current (dc) systems. This is because of the dc errors created within the detector itself. With the previous long range alpha detectors, the large radiation source strength created an output with a large number of overlapping pulses which, together with the instrumental noise and cosmic rays, smeared into a dc level that indicated the presence of alpha radiation, but from which one was unable to count individual alpha events.

In the present invention, which can detect relatively small alpha source strengths, ion pulses from individual alpha decays can be observed. This makes the invention an excellent detector for radon, or any other source of low strength alpha radiation. It is capable of rendering real time measurements, as opposed to the delays involved with conventional radon detectors, which must be forwarded to a laboratory for analysis after being in place for an extended period of time.

The energy lost by an alpha particle in ionizing an air molecule is approximately 35 eV, which indicates that a typical 5.5 MeV alpha decay from $^{222}$Rn will produce approximately 157,000 air ions. The ionized electron will quickly migrate to another air molecule, creating an ion pair consisting of two large, charged molecules. These ion pairs can be transported to an electrode where the current produced by these ion can be measured. If the alpha decay rate is sufficiently low to preclude pileup, current pulses produced by individual alpha decays can be measured. Since neither a cosmic ray nor instrumental noise can create the quantity of air ions necessary to produce a pulse, they will have no effect on the operation of the present invention.

It is therefore an object of this invention to present apparatus for counting individual alpha decay events.

It is another object of the present invention to present apparatus for the real time measurement of the presence of radon gas, or other low strength alpha radiation.

It is a further object of the present invention to provide a radon detector which is capable of high precision radon measurement over a wide range of concentrations.

It is a still further object of the present invention to provide a radon detector which has a short response time.

It is a feature of the present invention that it can be produced at low cost.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, an electrostatic single-event counting alpha detector comprises decay cavity means for allowing radon atoms to decay and has an inlet for admitting air and the radon atoms. High voltage electrode means are located inside the decay cavity means for collecting air ions created by collisions with alpha particles emitted from the decaying radon atoms or other alpha sources, and signal retrieval means are connected to the high voltage electrode means for sensing individual alpha decays as electrical pulses for counting.

In another aspect of the present invention, an electrostatic single-event counting alpha detector has as its high voltage electrode an electrically conductive pin located in a decay cavity comprised of a pair of nested enclosures, insulated from one another, and the inner enclosure of the pair of nested enclosures.

In yet another aspect of the present invention, an electrostatic single-event counting alpha detector has as its high voltage electrode a pair of parallel plates insulatively mounted in a decay cavity comprised of a single enclosure.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
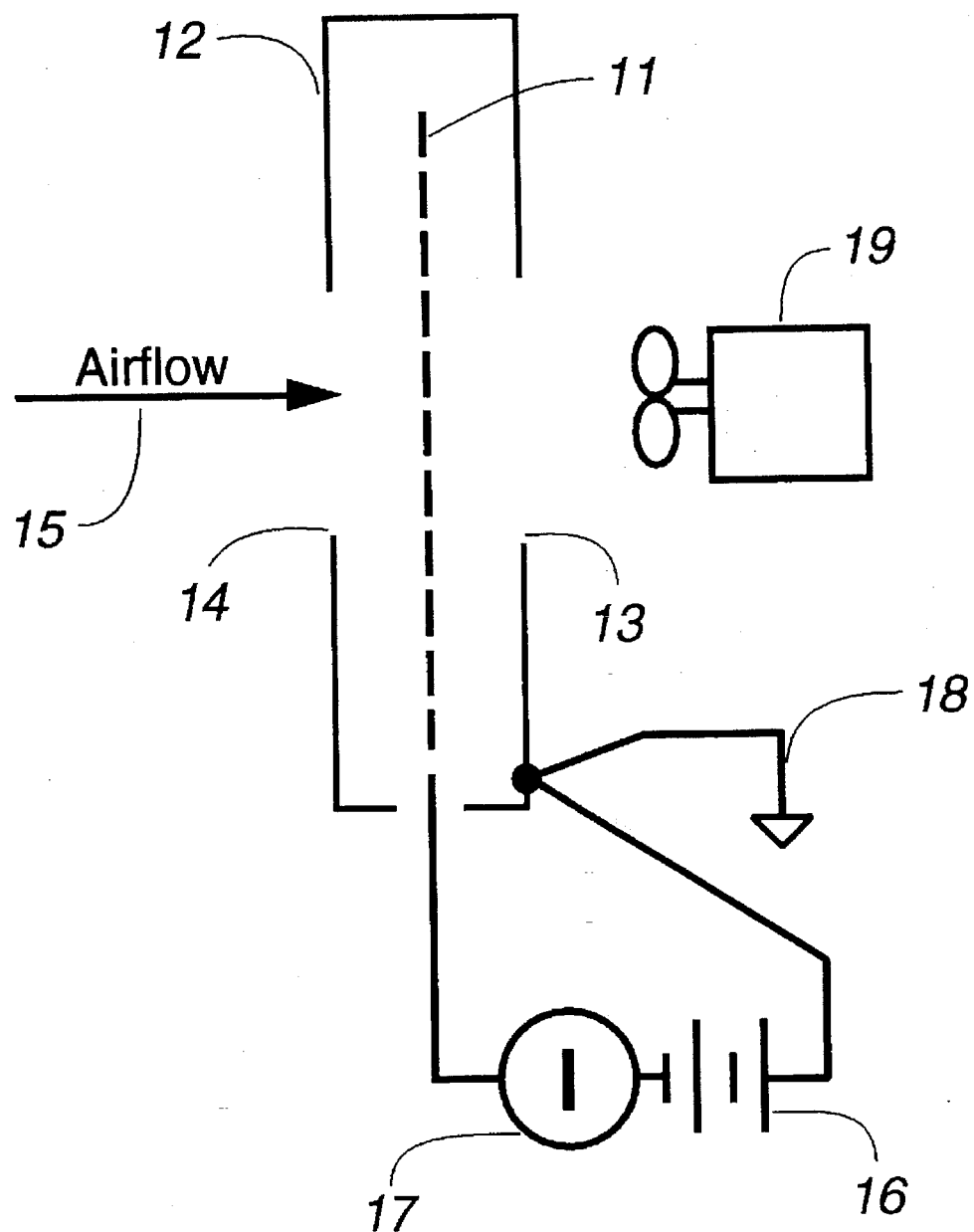
FIG. 1 is a schematical cross-sectional view of a conventional long range alpha detector.

The present invention reliably and in a short time detects individual alpha decay events, and therefore, the presence of radon gas or other alpha sources. It accomplishes this by building on the previous long range alpha particle detection technology, but utilizing novel improvements to provide for event counting. A schematical cross-sectional view of a conventional long range alpha detector 10 is illustrated in FIG. 1.

Long range alpha detector 10 comprises, in this embodiment, single grid 11 insulatively mounted inside grounded enclosure 12, which defines openings 13, 14 for allowing airflow 15 to flow across grid 11, drawn by fan 19. Single grid 11, in this embodiment, acts as both a signal grid and a voltage grid. Airflow 15 may contain both positive or negative air ions (not shown) created by collisions with alpha particles or other radioactive decay products. Voltage source 16 is connected between grounded enclosure 12 and single grid 11 through current meter 17. Signal ground 18 is also connected to grounded enclosure 12.

As is easily understood from FIG. 1, single grid 11 has both voltage source 16 and current meter 17, which detects the additional current flow caused by the air ions, connected to it, making it at the same time a signal grid and a voltage grid. Current meter 17 may take many forms, but may conveniently be an electrometer, such as a Keithley 617 electrometer.

With voltage source 16 connected, an electric field exists between single grid 11 and grounded enclosure 12. This field sweeps ions of one polarity onto single grid 11 while repelling ions of the opposite polarity. Of course, in this embodiment, a positive voltage source 16 will result in collection of negatively charged ions.

Although the embodiment of FIG. 1 is extremely efficient in detecting ions created by radiation, it is not particularly sensitive due to the fact that it is primarily a dc system. This is because of the dc errors created within the detector itself. In previous long range alpha detectors, the large radiation source strength created an output with a large number of overlapping pulses which smeared into a dc level for the detection of the presence of alpha radiation, but which did not allow for the counting of individual alpha events.

Figure 2:
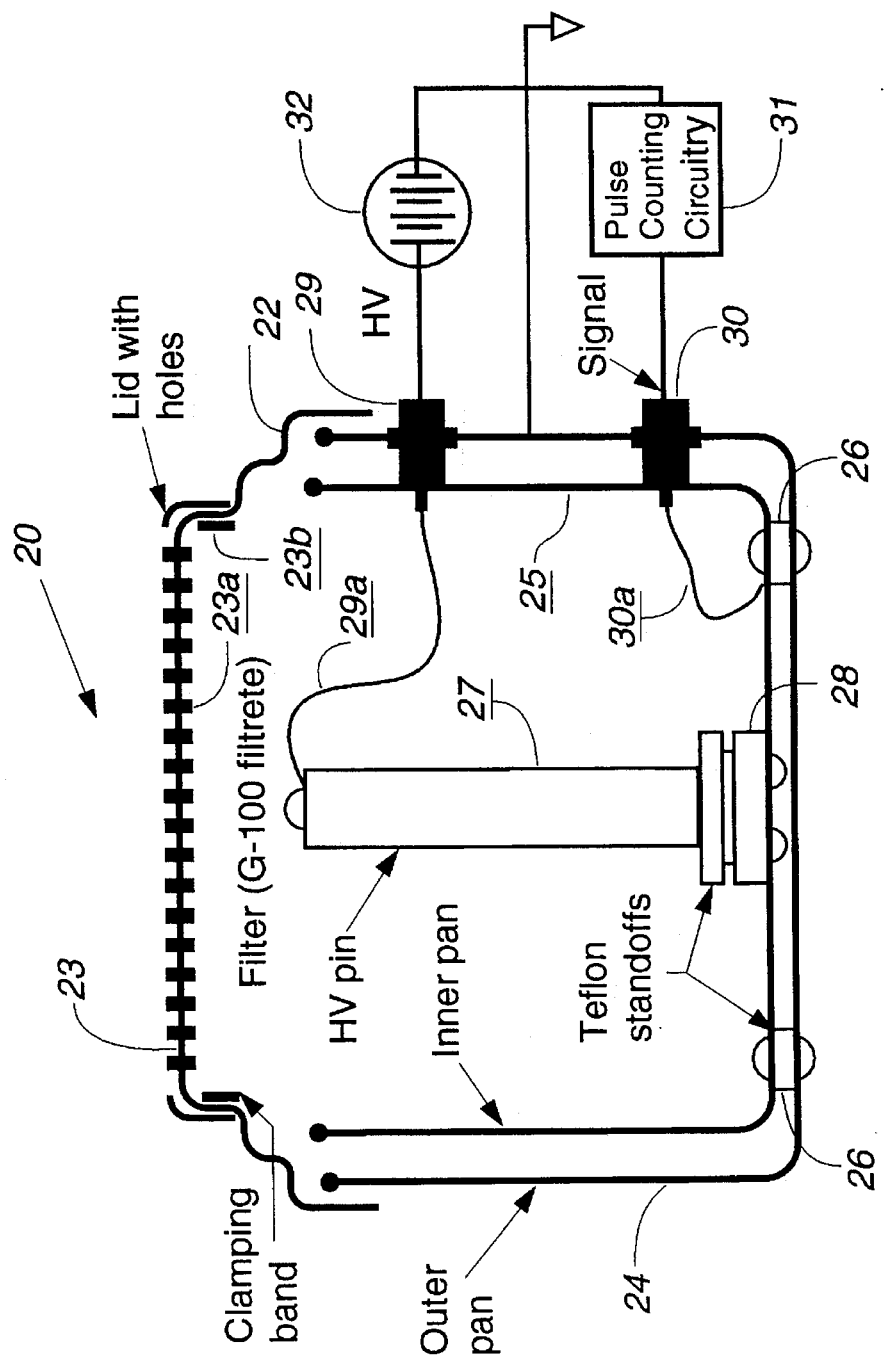
FIG. 2 is a schematic drawing of the components of one embodiment of the present invention for alpha event counting and the detection of radon or other sources of alpha radiation in which a pin is used as part of the detecting electrode.

A schematical representation of one embodiment of the present invention is illustrated in FIG. 2. Here, detector 20 is shown to comprise a lid 22 which is perforated to allow for the passage of air. A filter 23 underlies lid 22 and is held in place by a screen 23a and clamping band 23b. Lid 22 sealingly contacts outer enclosure 24 but is isolated from inner enclosure 25. As seen, inner enclosure 25 is insulated from outer enclosure 24 by standoffs 26, which may conveniently be made of TEFLON®. High voltage electrode 27 is centrally located within inner enclosure 25, insulatingly mounted to inner enclosure 25 by standoff 28, which may also be made of TEFLON®. Inner enclosure 25 constitutes the decay detection volume for the this embodiment of the invention.

High voltage BNC 29 is attached to outer enclosure 24 and has its inner lead 29a connected to high voltage pin 27. Electrical energy is provided to BNC 29 by a power source 32. Another BNC, signal BNC 30 is also attached to outer enclosure 24, and has its inner lead 30a connected to inner enclosure 25, and to pulse counting circuitry 31, which can include a current meter, if desired.

Filter 23 lies directly beneath perforated lid 22, and is intended to prevent unwanted pollutants such as radon progeny attached to dust motes or the like, cigarette smoke, automobile exhaust, or nesting insects from entering into and possibly interfering with the operation of detector 20. Filter 23 may be G-100 FILTRETE® manufactured by 3M Filtration Products, 3M Center Building, 275-6E-08, St. Paul, Minn. 55144-1000, or any other filter material which is effective to remove the necessary pollutants, without materially affecting the flow of air through perforated lid 22. As previously stated, filter 23 is supported by screen 23a and clamped in place by clamping band 23b. Filter 23 may not always be necessary, depending on the particular application.

Figure 3:
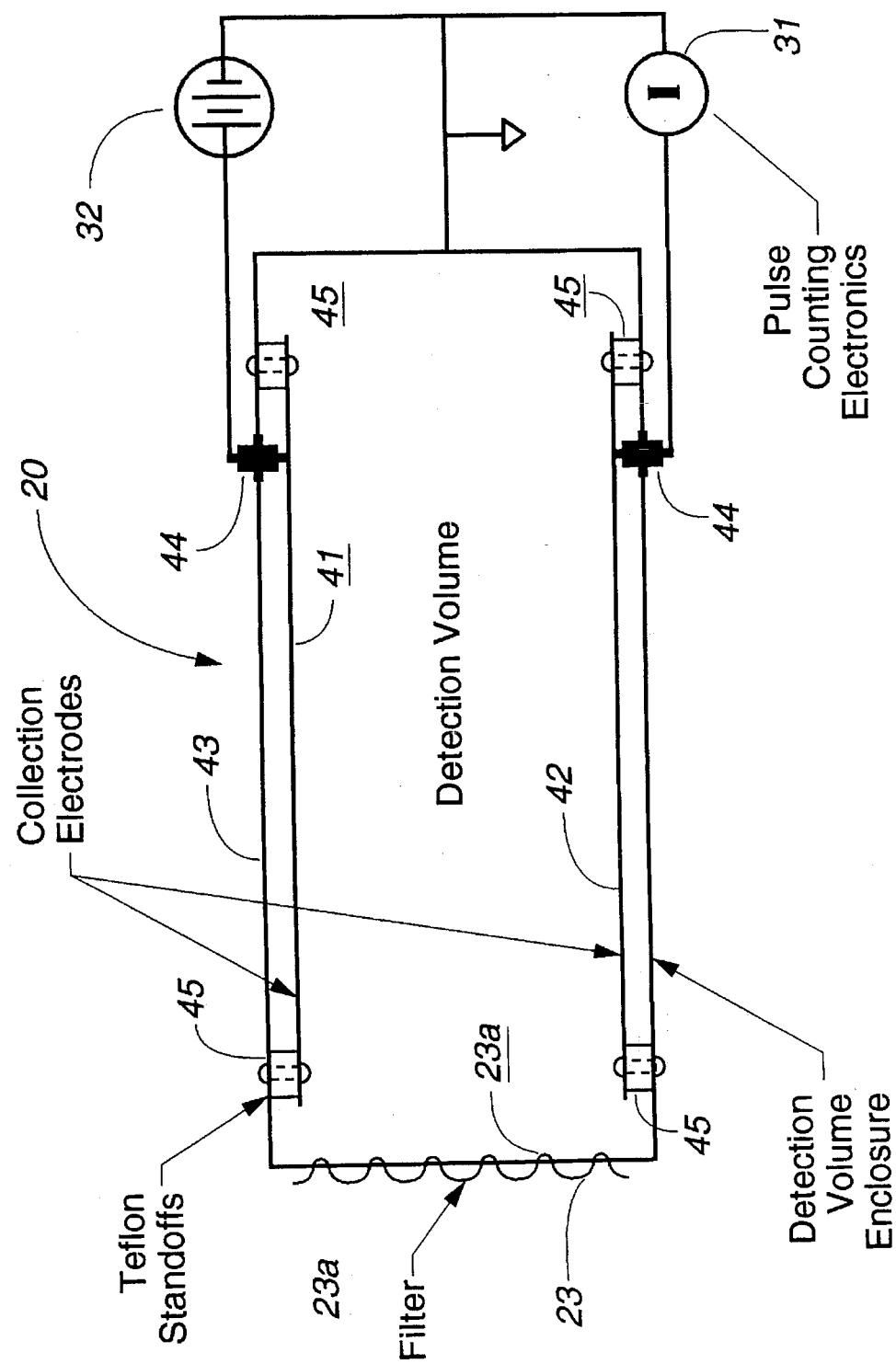
FIG. 3 is a schematic drawing of the components of another embodiment of the present invention in which parallel plates are used as the detecting electrode.

High voltage electrode 27, may either be pin shaped, as shown in FIG. 2, or, in other embodiments may be a pair of flat plates separated by approximately 10 cm, as is illustrated in FIG. 3, or any other design which can provide the necessary electric field within a decay detection volume such as inner enclosure 25. When using a pin with inner and outer enclosures, the enclosures must be insulated from one another, and the electric field exists between the pin and inner enclosure 25. Air ions created by alpha decays within the decay detection volume are collected on the inner enclosure 25 and produce a current pulse through pulse counting circuitry 31 to grounded outer enclosure 24. Pulse counting circuitry 31 counts the number of current pulses and the concentration of radon or other alpha contamination can be determined.

As shown in FIG. 3, when using parallel plates 41, 42, only one enclosure 43 is required, and the high voltage is applied to parallel plate 41 by direct connection. Parallel plate 42 is connected to grounded enclosure 43 through pulse counting circuitry 31. The connections to parallel plates 41, 42 are through enclosure 43 by way of feed through 44. Parallel plates 41, 42 are insulated from the enclosure 43 by standoffs 45, which may also be made of TEFLON®. In this embodiment filter 23 may be supported on both of its sides by screens 23a. The method of connecting power source 32 and pulse counting circuitry 31 is clearly illustrated in FIG. 3.

High voltage electrode, whether pin 27 (FIG. 2) or parallel plate 41 (FIG. 3), as well as nested enclosures 24, 25 (FIG. 2) or enclosure 43 (FIG. 3) may be made of any good electrically conducting material, although aluminum may be preferred because of its light weight.

Detector 20 is capable of operating over a wide range of voltages. Although acceptable operation has been achieved with as little as 10 V/cm, excellent performance has been attained at 40 V/cm, or approximately 300 V between a pin and inner enclosure 25, or between parallel plates 41, 42 (FIG. 3). Voltages necessary to produce fields of up to 100 V/cm would be acceptable.

Electrical power for supplying the present invention may be provided by sources that are convenient for the application. Portable or home applications generally require battery power, which will also provide the least noisy signal and, therefore, the highest sensitivity. As previously discussed the high voltage required by detector 20 is normally approximately 300 V, and can be easily supplied by a battery. The extremely low current demand imposed by detector 20 indicates that a battery's operational lifetime would approximate its "shelflife."

The volume of inner enclosure 25, in the case of a pin for high voltage electrode 27, or simply the size of the cavity in the case of parallel plates, can be determined by the amount of expected alpha radiation. Detector 20 has performed well at a volume of 1.5 liters. However, volumes ranging from approximately 0.25 liter up to 5 liters or more may also be appropriate.

Figure 4:
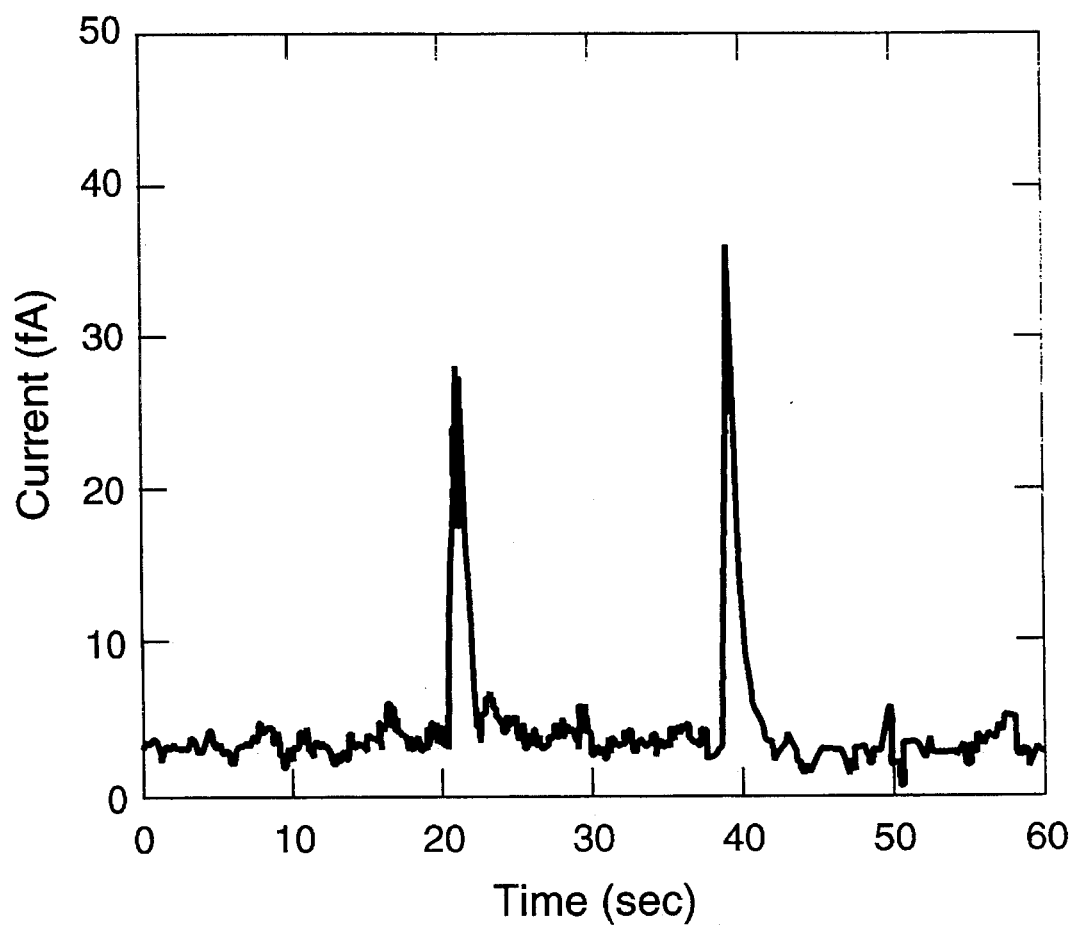
FIG. 4 is output produced by the present invention operating in a 1 pCi/L environment over a 1 minute interval.

Signal BNC 30 connects inner enclosure 25 (or one of the parallel plates) to pulse counting circuitry 31. Typical current output from signal BNC 30 is illustrated in FIG. 4. Two alpha decays can be seen, one at approximately 20 seconds, and the other at approximately 40 seconds. Pulse counting circuitry 31 consist of conventional electronics for pulse processing capable of distinguishing and counting the single-event alpha current pulses illustrated in FIG. 4. Other outputs, perhaps more acceptable for home applications are also possible. As seen in FIG. 4, the steep pulses occurring at approximately 20 and 40 seconds are due to ions from individual alpha decays reaching high voltage electrode 27. These pulses, with approximately 28 and 37 femtoampere peaks, are from a 1 pCi/L radon environment over a 1 minute time interval. In a 40 V/cm field, all the ions from a single alpha decay arrive at high voltage electrode 27 within 3 seconds of the event.

Figure 5:
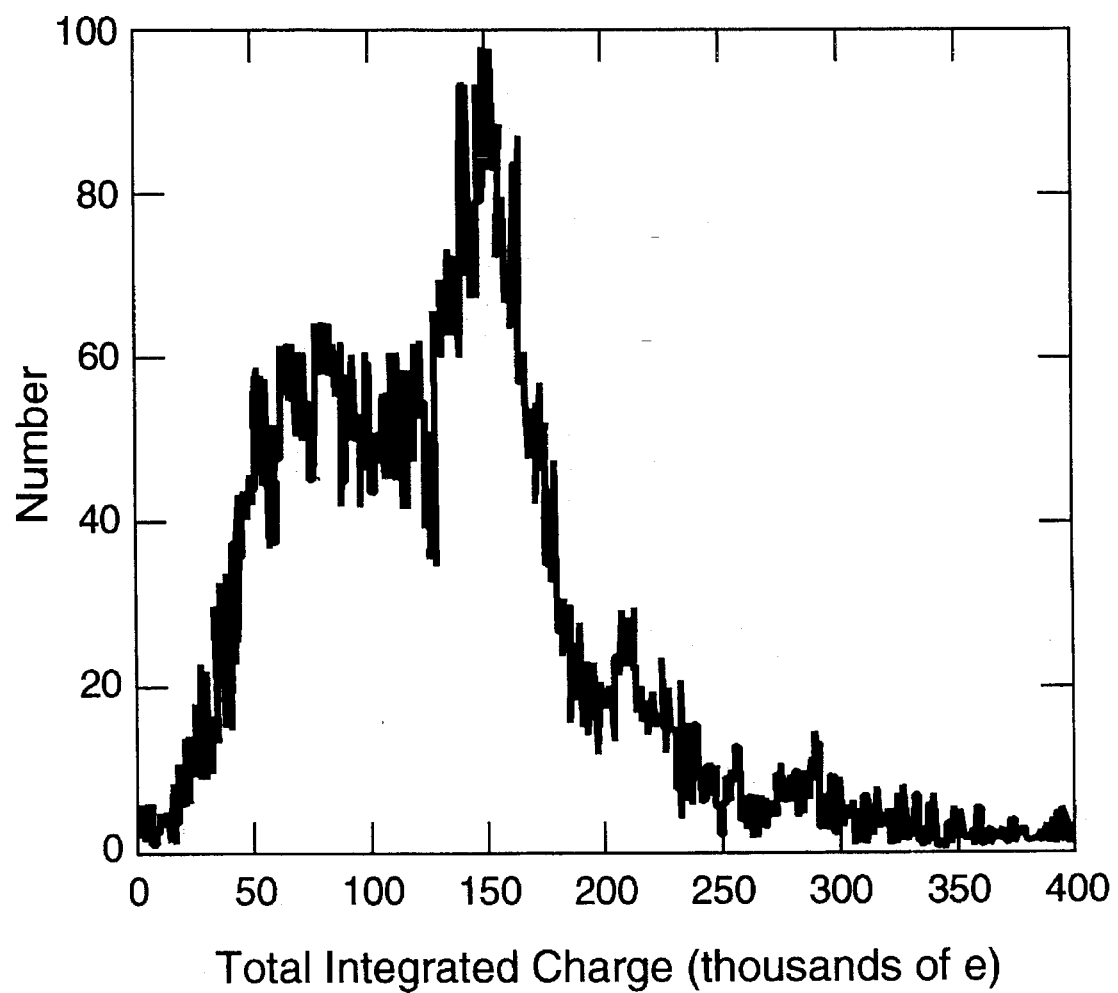
FIG. 5 is a histogram of the total integrated charge per event for the data illustrated in FIG. 3.

A histogram of the total integrated charge per event for detector 20 is illustrated in FIG. 5. The peak from the 5.5 MeV decays of $^{222}$Rn is clearly shown. A peak value of 150,000 electric charges corresponds to a collection efficiency of approximately 95%.

For a detector 20 having a decay volume of 1.5 liter operating in radon concentration environments below about 15 pCi/L, the improvement in long term detection stability achieved by counting current pulses from individual alpha decays instead of measuring the total current, as was done with previous LRADs, is clearly shown in FIG. 6. The measurements illustrated in FIG. 6 were made by injecting approximately 40 pCi/L of $^{222}$Rn into detector 20. The radon was allowed to naturally diffuse out of detector 20, while both the total integrated current and the number of individual current pulses produced were simultaneously measured.

Figure 6:
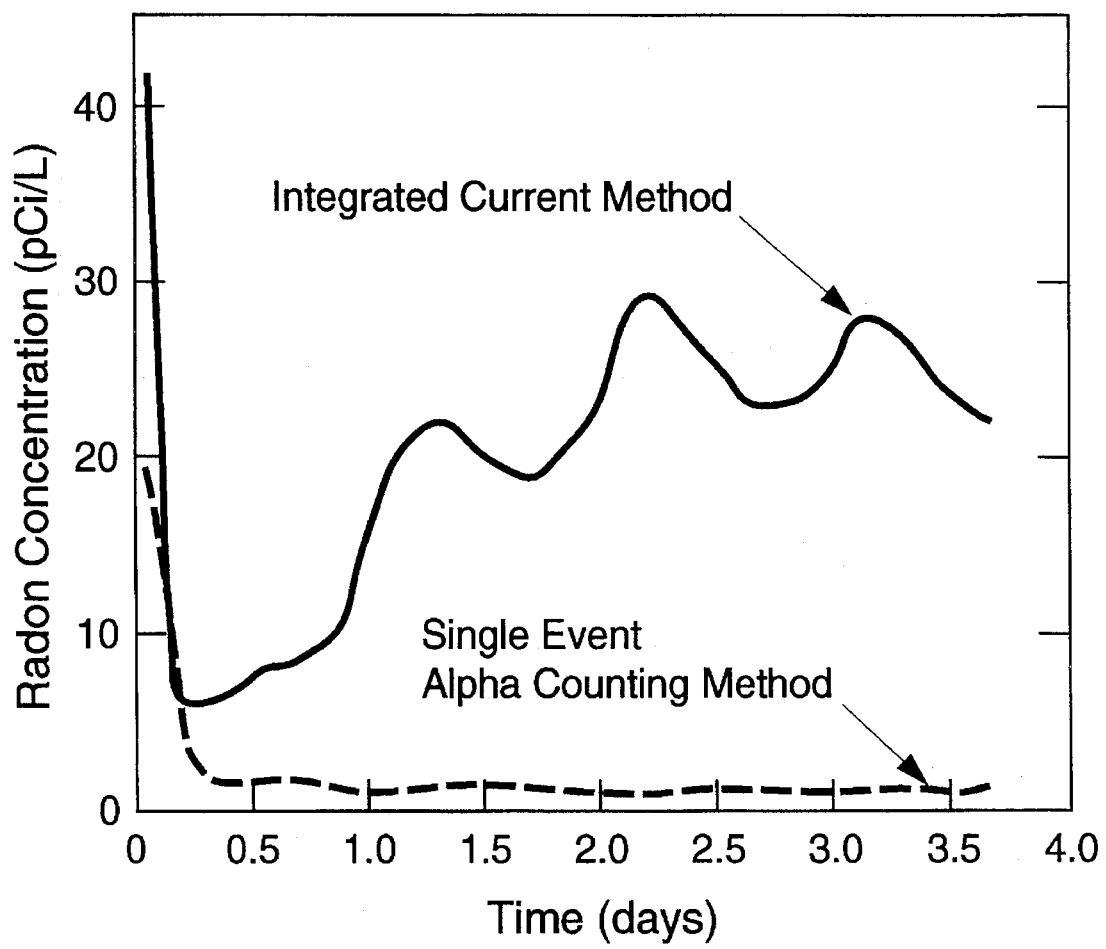
FIG. 6 is a graph comparing the long-term stability of the integrated current method and the single event alpha counting method of the present invention.

As shown in FIG. 6, after approximately 8 hours, the radon reached an equilibrium concentration of approximately 1 pCi/L, which was maintained for several days. Also clearly shown is the fact that the integrated current measurement exhibits large fluctuations which are attributable to drift in the readout electronics zero offset value caused by temperature fluctuations. Importantly, the single event counting measurement is unaffected by these temperature drifts, and remains stable throughout the period shown in FIG. 6.

It should be understood that, for a decay volume of 1.5 liters, the single-event alpha counting measurement becomes non-linear at radiation concentrations above approximately 15 pCi/L, due to the pileup of individual pulses. A smaller decay volume would allow detector 20 to operate in the single-event alpha counting mode over a larger radiation concentration range.

As is clear from the description of detector 20, although capable of high precision event measurement, it is comprised of relatively inexpensive and easily obtainable components. For this reason, individual units would be relatively inexpensive, and suitable for home use. For home use, pulse counting circuitry 31 could include circuitry for producing an alarm when a predetermined count rate has been exceeded.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electrostatic single-event counting alpha detector comprising:

decay cavity means for allowing radon atoms or other alpha radiation emitters to decay, having an inlet for admitting air and said radon atoms or other alpha radiation emitters, said decay cavity means comprising two nesting, inner and outer enclosures insulated from each other; and high voltage electrode means located inside said decay cavity means for collecting air ions created by collisions with alpha particles emitted from said decaying radon atoms or other alpha radiation, said high voltage electrode means comprising an electrically conductive pin insulatively mounted to said inner enclosure; and signal retrieval means connected to said high voltage electrode means for sensing individual alpha decays as electrical pulses for counting.

2. An electrostatic single-event counting alpha detector comprising:

decay cavity means for allowing radon atoms or other alpha radiation emitters to decay, having an inlet for admitting air and said radon atoms or other alpha radiation emitters, said decay cavity means comprising a single enclosure; and high voltage electrode means located inside said decay cavity means for collecting air ions created by collisions with alpha particles emitted from said decaying radon atoms or other alpha radiation, said high voltage electrode means comprising two spaced apart parallel electrically conductive plates insulatively mounted to said single enclosure; and signal retrieval means connected to said high voltage electrode means for sensing individual alpha decays as electrical pulses for counting.

\* \* \* \* \*